(12) United States Patent
Turley et al.

(10) Patent No.: US 8,391,698 B2
(45) Date of Patent: Mar. 5, 2013

(54) SYSTEMS AND METHODS OF GENERATING Z-BUFFERS FOR AN IMAGE CAPTURE DEVICE OF A CAMERA

(75) Inventors: Richard Turley, Fort Collins, CO (US);
Andrew C. Goris, Loveland, CO (US);
David Branson, Fort Collins, CO (US);
David R. Lawson, Greeley, CO (US);
Donald J. Stavely, Windsor, CO (US);
David K. Campbell, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1982 days.

(21) Appl. No.: 11/261,276

(22) Filed: Oct. 28, 2005

(65) Prior Publication Data

US 2007/0098388 A1    May 3, 2007

(51) Int. Cl.
*G02B 7/32* (2006.01)
(52) U.S. Cl. .......................... 396/111; 396/125; 396/106
(58) Field of Classification Search .................... 396/111
See application file for complete search history.

(56) References Cited

U.S. PATENT DOCUMENTS

| | | | |
|---|---|---|---|
| 3,619,058 A | 11/1971 | Hewlett et al. | |
| 4,521,107 A | 6/1985 | Chaborski et al. | |
| 5,680,648 A * | 10/1997 | Nonaka | 396/109 |
| 6,288,775 B1 | 9/2001 | Tanaka | |
| 6,441,818 B1 | 8/2002 | Kurose | |
| 6,630,931 B1 | 10/2003 | Trika et al. | |
| 6,690,369 B1 | 2/2004 | Smith, Jr. et al. | |
| 6,829,043 B2 | 12/2004 | Lewis et al. | |
| 6,882,342 B2 | 4/2005 | Suzuki et al. | |
| 6,958,779 B2 * | 10/2005 | Kubo | 348/371 |
| 7,268,341 B2 * | 9/2007 | Lehoty et al. | 250/221 |

OTHER PUBLICATIONS

Thompson, Laird, "Creating and Detecting Rayleigh Laser Guide Stars", Center for Adaptive Optics Newletter, Design Copyright 2002 University of California Regents.

Turk, Matthew A., et al., "VITS—A Vision Systems for Autonomous Land Vehicle Navigation", IEEE Transactions on Pattern Analysis and Machine Intelligence, vol. 10, No. 3, 5-88.

* cited by examiner

*Primary Examiner* — Clayton E Laballe
*Assistant Examiner* — Leon W Rhodes, Jr.

(57) ABSTRACT

Systems and methods for implementing Z-buffer generation in a camera are disclosed. In an exemplary embodiment the method may comprise exposing a plurality of pixels on an image capture device to a modulated light signal reflected from different regions of a scene adjacent a camera after different delays. The method may also comprise correlating intensity of the modulated light signal received by the image capture device for each the different delays to determine a flight time of the modulated light signal. The method may also comprise generating a Z-buffer corresponding to the different regions of the scene based on the correlation.

20 Claims, 6 Drawing Sheets

SYSTEMS AND METHODS OF GENERATING Z-BUFFERS FOR AN IMAGE CAPTURE DEVICE OF A CAMERA

RELATED APPLICATION

This application is related to co-owned U.S. Patent Application for "Systems and Methods of Generating Z-Buffers in Cameras" of Turley, et al. Ser. No. 11/261,109, filed on the same date.

TECHNICAL FIELD

The described subject matter relates to cameras in general, and more particularly to systems and methods of generating Z-buffers for an image capture device of a camera.

BACKGROUND

Conventional film, and more recently digital cameras, are widely commercially available. Cameras range both in price and in operation from sophisticated single lens reflex (SLR) cameras used by professional photographers to inexpensive "point-and-shoot" cameras that nearly anyone can use with relative ease, However, all of these cameras operate with little, if any, information about th Z-axis is (i.e., the distance from the camera to objects regions of the scene being photographed).

Some digital cameras repeatedly take images of relatively small, predefined regions of the overall scene being photographed to estimate a distance to a particular object in the predefined region for focusing the lens to that object. However, no distance information is obtained for other regions of the scene being photograped. Typically a focus number representing the final lens position is stored with a low resolution focus image that can only be used for focusing the camera. In addition, any information which was gathered is used to focus the camera and is then discarded.

SUMMARY

An exemplary embodiment of Z-buffer generation for an image capture device of a camera may be implemented in a system. The system may comprise an image capture device having a plurality of pixels, and a variable transmittance shutter opening to expose the plurality of pixels on the image capture device to a modulated light signal reflected from different regions of a scene adjacent the camera. A processor is operatively associated with the image capture device, the processor generating a Z-buffer for the plurality of pixels based on the modulated light signal reflected from the different regions of the scene.

In another exemplary embodiment, Z-buffer generation for an image capture device may be implemented as a method, comprising: exposing a plurality of pixels on an image capture device to a modulated light signal reflected from different regions of a scene adjacent a camera after different delays, correlating intensity of the modulated light signal received by the image capture device for each the different delays to determine a flight time of the modulated light signal, and generating a Z-buffer corresponding to the different regions of the scene based on the correlation.

DETAILED DESCRIPTION

Briefly, light emitted at a camera and reflected from objects in a scene adjacent the camera may be used to determine information about the Z-axis (or "distance information") to objects in the scene. This distance information may be stored in a Z-buffer for the camera.

Distance information stored in the Z-buffer may be used before image capture for use by the camera, e.g., to control lens focus. Distance information stored in the Z-buffer may also be used after image capture for editing purposes (e.g., adding or removing layers of the image), and/or for special effects (e.g., blurring foreground/background elements), to name only a few examples.

Exemplary System

Figure 1:
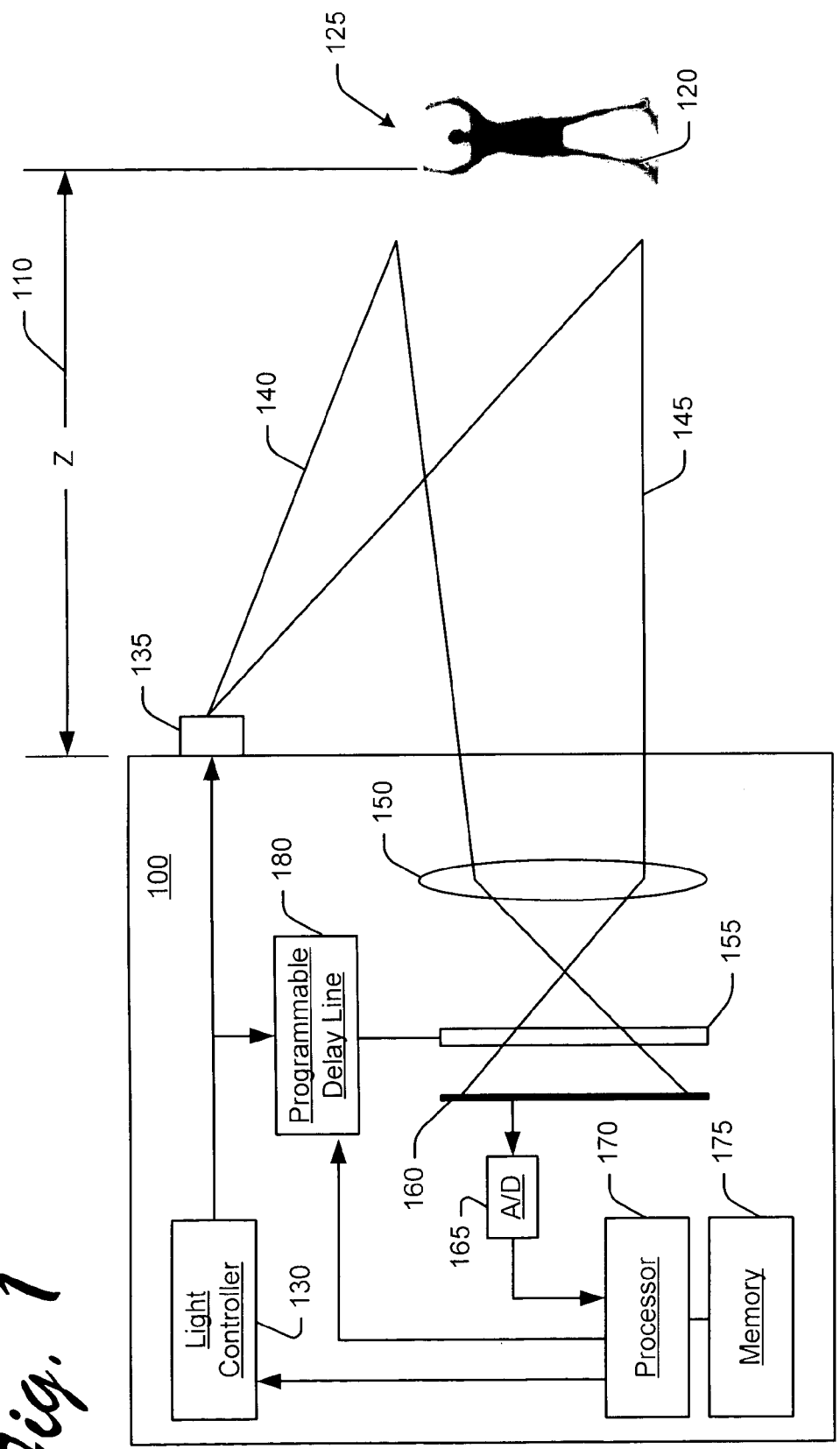
FIG. 1 is a high-level diagram of an exemplary camera system which may be implemented for generating Z-buffers for an image capture device.

FIG. 1 is a high-level diagram of an exemplary camera system 100 which may be implemented for generating Z-buffers. Camera systems include both digital and film cameras now known or that may be later developed. Exemplary camera system 100 may implement at least some of the existing imaging circuitry for determining the distance 110 of the camera system 100 from one or more objects 120 in a scene 125 adjacent the camera system 100.

In an exemplary embodiment, the circuitry includes a light controller 130 operatively associated with a light source 135. The light controller 130 may be implemented as a signal generator capable of generating one or more waveform for emission by the light source 135. Exemplary waveforms are described in more detail below with reference to FIG. 3. The light source 135 may be implemented using any suitable lights, such as, e.g., light emitting diodes (LEDs), laser, etc., emitting visible or invisible light (e.g., infrared or IR light). The light source 135 is capable of simultaneously illuminating different regions in the scene 125.

Exemplary camera system 100 may also include a lens 150 positioned in the camera system 100 to focus reflected light 145 from the scene 125 through a variable transmittance shutter 155 (e.g., a high-speed shutter such as, but not limited to, an LCD or Pockels cell) onto an image capture device 160. Exemplary lens 150 may be any suitable lens which focuses light reflected from the scene 125 onto image capture device 160.

Variable transmittance shutter 155 may be implemented using a high-speed liquid crystal device, whereby the transmittance of the shutter is controlled by a voltage signal from the programmable delay line 180. In an exemplary embodiment, the amount of light allowed through the variable transmittance Shutter 155 opens and closes in direct response to the waveform of the modulated light signal being generated.

Exemplary image capture device 160 may be implemented as a plurality of photosensitive cells, each of which builds-up or accumulates an electrical charge in response to exposure to light. The accumulated electrical charge for any given pixel is proportional to the intensity and duration of the light exposure. Exemplary image capture device 160 may include, but is not limited to, a charge-coupled device (CCD), or a complementary metal oxide semiconductor (CMOS) sensors In an exemplary embodiment, lens 150, variable transmittance shutter 155, and image capture device 160 are provided as part of the existing image capture circuitry in camera system 100 for capturing an image of the scene 125.

Exemplary camera system 100 may also include a processor 170 for determining the distance (Z) 110 to one or more objects 120 in the scene 120 based on the reflected light 145 received at the camera system 100. Processor 170 may also be provided as part of the existing image capture circuitry, or provided separately. In an exemplary embodiment, the processor 170 actuates the light controller 130 and variable transmittance shutter 155 via a programmable delay line 180.

Delay lines are well understood in the electronics arts. An exemplary analog delay line may be implemented as a low-pass filter including inductors and shunt capacitors which delay the input signal by a specified time (or phase shift). Alternatively, an exemplary digital delay line may be implemented as a shift register with programmable length or clock length. Programmable delay line may be implemented to vary the delay for different cycles, as discussed in more detail below. It is noted, however, that delay line 180 is not limited to any particular implementation.

During operation, the processor 170 actuates the light controller 130 to emit one or more modulated light signals. The processor may also signal the programmable delay line 180 to actuate the variable transmittance shutter 155 after a predetermined (or estimated) delay. The modulated light signal is emitted by light source 135 (e.g., as light 140) and reflected from one or more region in the scene 125 (e.g., as light 145). The variable transmittance shutter 155 is actuated (e.g., by the processor 170 via programmable delay line 180) such that the image capture device 160 receive the reflected light signal 145 after the predetermined delay. The light signal accumulated at the image capture device 160 is integrated and input via an analog-to-digital (A/D) converter 165 to the processor 170, e.g., as a brightness value.

The light controller 130 may cause the light source 135 to continuously cycle, thereby emitting light 140 according to the waveform generated by the light controller 130, e.g., every 1/60th of a second for several seconds. The estimated delay introduced by the delay line is varied (e.g., increased or decreased) for each cycle. Accordingly, the processor 170 receives a brightness value for each pixel (or group of pixels) on the image capture device 160 for each cycle.

The processor 170 compares the brightness values For each pixel (or group of pixels), e.g., as discussed in more detail below with reference to FIG. 3 and 4. The most intense brightness value for each pixel (or group of pixels) corresponds to the actual flight time of the light (e.g., light signal 140 and 145). The processor 170 then uses the time (e.g., programmed at the delay line 180) for the waveform which has the "best fit" to calculate the distance 10 to an object 120 in the scene 125, e.g., using calculations based on the speed of light. Accordingly, the processor 170 is able determine the distance corresponding to different pixels on the image capture device 160.

Processor 170 may also be operatively associated with memory 175 for storing the distance information for objects in different regions of the scene 125. In an exemplary embodiment, the distance information for each pixel (or group of pixels) is stored in a Z-buffer, such as, e.g., the Z-buffer discussed in more detail below with reference to FIG. 5. The Z-buffer and/or data from the Z-buffer may also be stored as a removable memory or as a downloadable file, e.g., in TIFF or JPEG-2000 format.

Figure 2:
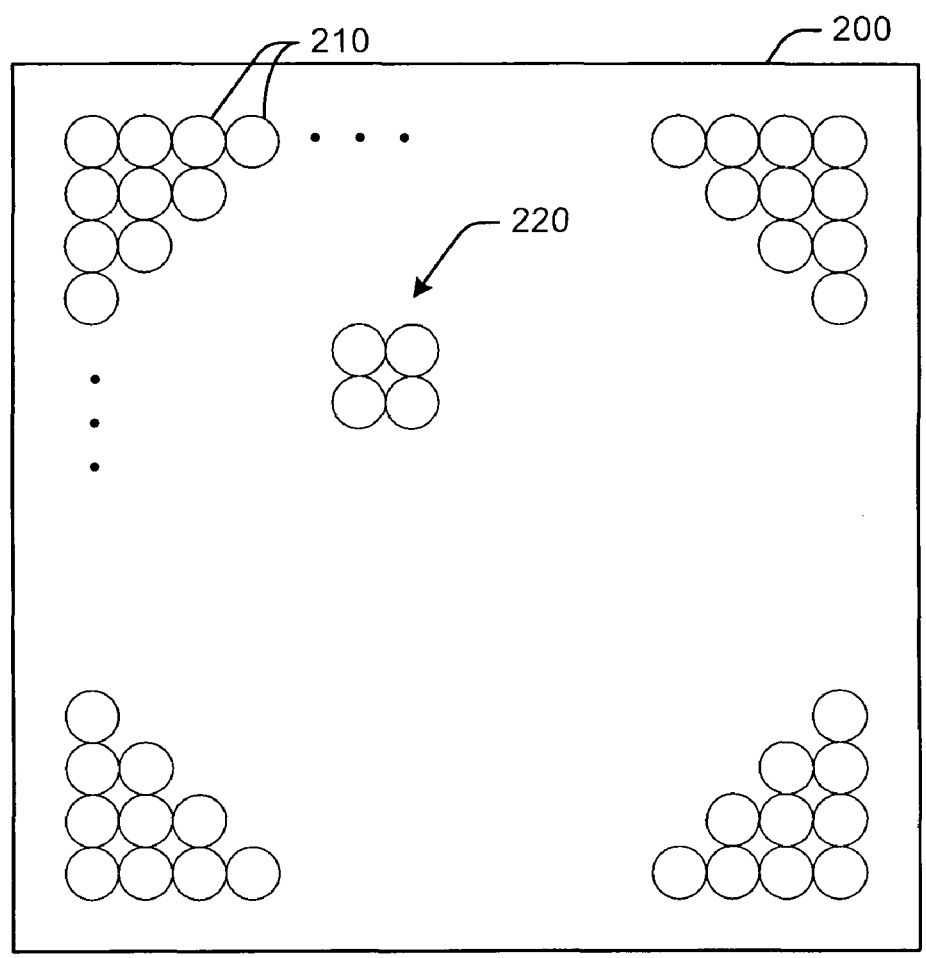
FIG. 2 is a high-level illustration of an exemplary image capture device of a camera.

FIG. 2 is a high-level illustration of an exemplary image capture device 200, such as the image capture device 160 of camera system 100 in FIG. 1. Image capture device 200 may include a plurality of photosensitive elements or "pixels" 210. ft is noted that any suitable image capture device 200 may be implemented, and may include any number of pixels 210 arranged in any suitable manner.

As mentioned above, existing image capture device 200 for the camera may be implemented for generating Z-buffers at the camera. In an exemplary embodiment, the image capture device 200 is exposed to varying amounts of light transmitted through the variable transmittance shutter. The amount of light is a function of time, based on the modulated light signal being generated. In any event, the modulated light signal reflected from different regions of a scene adjacent the camera (e.g., scene 125 in FIG. 1) may be received by pixels 210 and used to determine distance information corresponding to each pixel 210 or group or pixels 220, as described in more detail below with reference to FIGS. 3 and 4.

It is noted that noise introduced by low-light conditions and/or the camera itself (e.g., speed of the image capture device) may be corrected or compensated by combining output of adjacent pixels to boost the overall signal for those pixels. Any loss in resolution may be tolerated because the desired resolution for a typical Z-buffer is often less than the desired resolution for the image itself.

Figure 3:
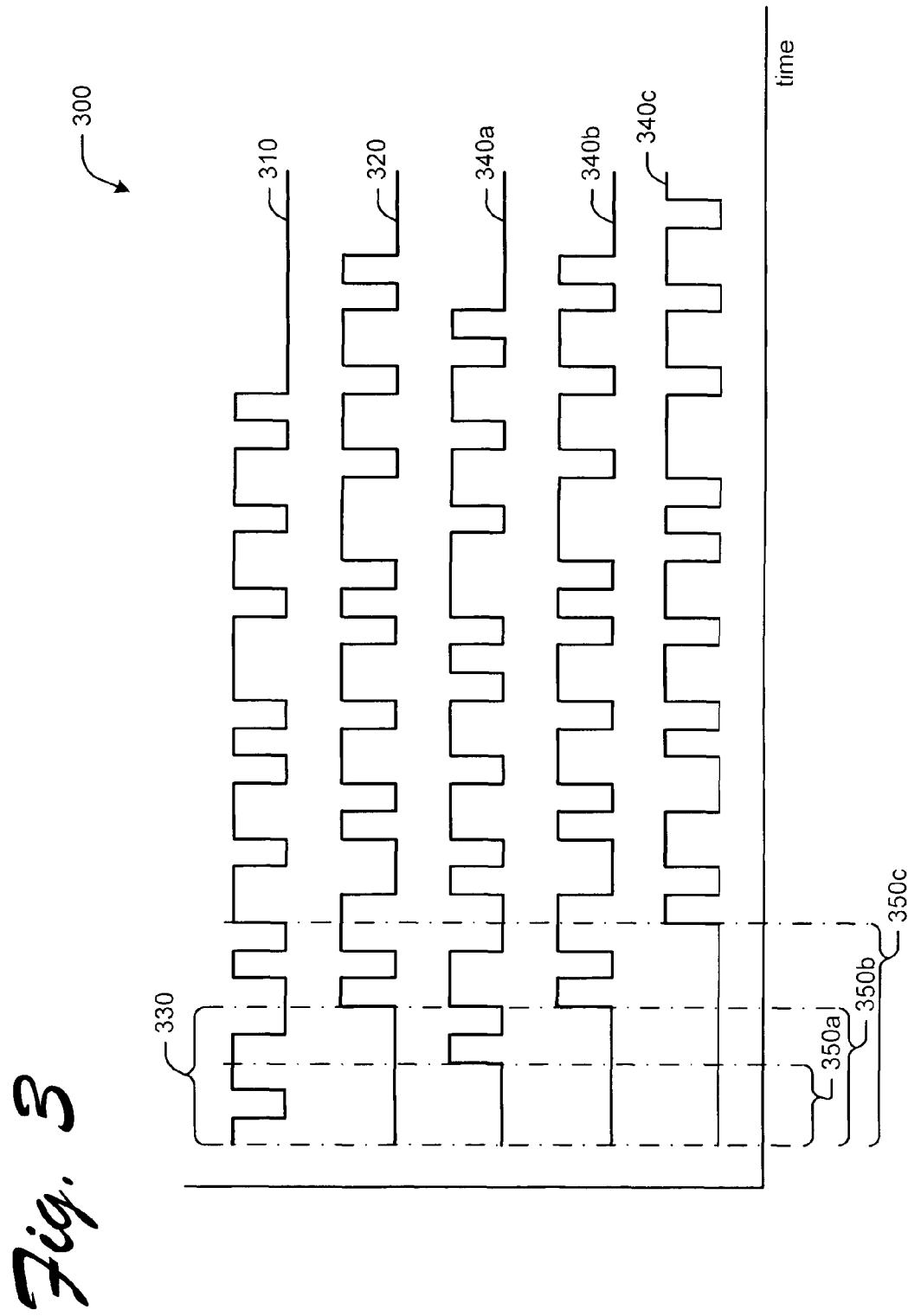
FIG. 3 is a waveform diagram illustrating exemplary waveforms of light signals for generating Z-buffers.

FIG. 3 is a waveform diagram 300 illustrating exemplary waveforms for light signals. Waveform 310 illustrates an exemplary light signal which may be emitted by a light source at a camera (e.g., light source 130 for the camera system 100 shown in FIG. 1). Waveform 320 illustrates an exemplary light signal which may be received at the camera after the light is reflected from a scene adjacent the camera (e.g., at light sensor 160 in FIG. 1).

In an exemplary embodiment, the waveforms may be implemented as pseudo-noise (P-N) codes. The behavior of P-N codes is well-understood in the electronics arts and therefore can readily be implemented with well-known autocorrelation functions. However, it is noted that the waveforms may be any digital or analog signal.

Although any suitable waveform(s) may be used, complex waveforms may be implemented to reduce the effects of interference from other signals, ambient light, and/or other noise. It is also noted that the waveforms may have any suitable period. In exemplary embodiments, the period may be of sufficient length (e.g., based on estimate flight times) so as to reduce the effects of phase shift on distance calculations (also known as "aliasing").

In any event, the flight time 330 (i.e., the time it takes the transmitted light signal 320 to reach an object in the scene and be reflected to the light sensor) may be used to determine distance to objects in the scene as follows. In an exemplary embodiment, the actual flight time 330 may be determined by actuating the light sensor and measuring brightness values after known delays (e.g., by actuating the light sensor 160 using programmable delay line 180 in FIG. 1). For purposes of illustration, waveform 340a illustrates actuation of the light sensor after a first delay 350a during a first cycle, waveform 340b illustrates actuation of the light sensor after a second delay 350b during a second cycle, and waveform 340c illustrates actuation of the light sensor after a second delay 350c during a third cycle. The light accumulated at the light sensor during an accumulation window may be integrated to determine an overall brightness value for each cycle.

Figure 4:
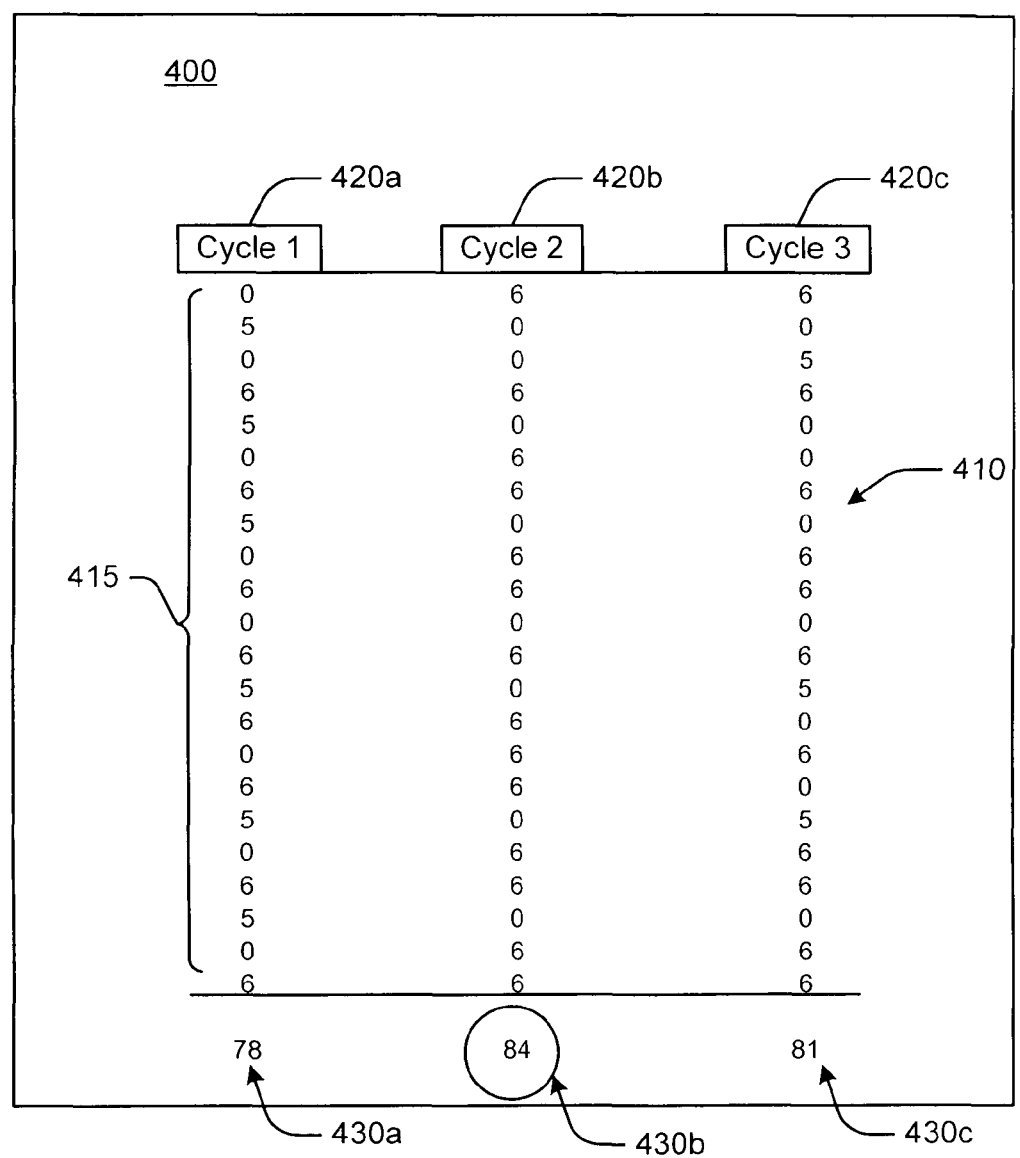
FIG. 4 is a table illustrating exemplary light accumulation for three cycles corresponding to different delays for actuating the light sensor.

FIG. 4 is a table 400 illustrating exemplary light accumulation 410 for three cycles 420a-c corresponding to different delays for actuating the light sensor, (e.g., waveforms 340a-c in FIG. 3) to determine overall brightness values 430a-c. In an exemplary embodiment, light accumulation values 410 may be the number of photons received at the light sensor during accumulation window 415. Corresponding brightness values 430a-c are also shown for each cycle 420a-c, respectively (e.g., as the summation of the light accumulation during accumulation window 415).

Brightness values 430a-c may be obtained using autocorrelation functions well-understood in the electronics arts. In an exemplary embodiment, pseudo-noise modulation of the transmitted light may be implemented. The autocorrelation function of pseudo-noise modulation results in a readily detected peak, yielding superior phase locking between the transmitted and reflected light. It is noted, however, that any correlation function may be implemented and is not limited to use with pseudo-noise modulation.

A processor may then be implemented to compare the brightness values 430a-c for each cycle 420a-c to arrive at the actual flight time. The actual flight time may then be used to determine distance information for an object in the scene. For purposes of illustration, the brightness value 430b for the second cycle 420b shows the highest correlation (or "best fit") between the reflected light and actuation of the light sensor (e.g., waveforms 320 and 340b in FIG. 3). Accordingly, the delay used to actuate the light sensor during the second cycle (e.g., delay 350b in FIG. 3) corresponds to the actual flight time and may be used by the processor to determine distance information for an object in the scene, e.g., using calculations based on the speed of light.

It is also noted that the effects of noise may be reduced using well-known noise reduction techniques. One such noise-reduction technique includes measuring and subtracting ambient light from the signal strength. Another noise-reduction technique for reducing the effect of camera shake or motion in the scene includes re-sampling, matching the re-sampled image to the original image, and then comparing the "aligned" images. The effects of noise may also be reduced after the distance information is stored in a Z-buffer, as discussed in more detail below with reference to FIG. 5.

Figure 5:
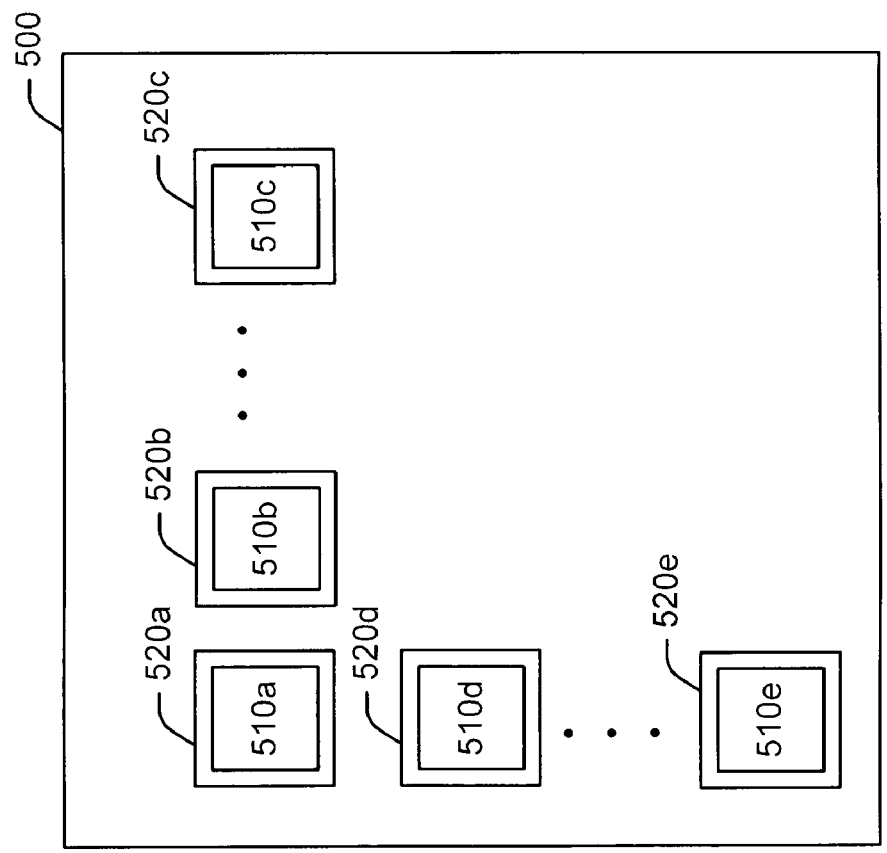
FIG. 5 is a diagrammatic illustration of an exemplary Z-buffer.

FIG. 5 is a diagrammatic illustration of an exemplary Z-buffer 500. The term "Z-buffer" as used herein is an area in memory (e.g., a data structure) reserved for storing distance information corresponding to pixels (or groups of pixels) of the image capture device in a camera. Exemplary Z-buffer 500 includes distance information 510a-e (e.g., Z-axis or distance values to objects in the scene) corresponding to pixels 520a-e of the image. Distance information may be determined for each pixel as discussed above.

It is noted that Z-buffer 500 may include any number of pixels, limited only by practical considerations, such as, e.g., desired granularity, file size, processing speed, and the ability to effectively determine distance information for each pixel (or group of pixels). It is also noted that the Z-buffer 500 does not need to match the size of the image (e.g., it does not need to include all areas of the image).

In exemplary embodiments, data management techniques may be implemented to increase processing speeds and reduce file size for the Z-buffer 500, thereby enabling the Z-buffer 500 to be more readily stored, accessed, and manipulated within the memory constraints of the camera system. For example, the distance information 510a-e may be compressed using conventional data compression techniques to reduce the file size.

In addition, distance information may be stored in the Z-buffer 500 using a non-linear format (e.g., as 1/Z or as log Z, where Z is the distance information). Although storing distance information in a non-linear format may reduce the precision of distance measurements farther from the camera, greater precision may be maintained for distance measurements closer to the camera. Such a technique may be implemented if distinguishing between distances close to the camera (e.g., between 3 feet and 4 feet) is more important to the user than distinguishing between distances farther from the camera (e.g., between 103 feet and 104 feet).

The Z-buffer 500 may be further processed to correct distance information 510a-e that has already been stored, e.g., to reduce the effects of noise on distance measurements. In an exemplary embodiment, the Z-buffer may be processed using spatial filtering techniques. By way of illustration, distance information for one or more pixels (e.g., distance information 510a for pixel 520a) may be compared to distance information for adjacent pixels (e.g., distance information 510b and 510d) and "corrected" if it is outside predetermined boundaries. For example, distance information may be deleted or modified based on distance information for adjacent pixels, e.g., by averaging.

In any event, Z-buffer 500 may be implemented by the camera and/or the user for any of a wide variety of different functions. For example, distance information stored in the Z-buffer 500 may be used to control lens focus and other effects (e.g., blurring foreground and/or background elements), to name only a few examples. Distance information stored in the Z-buffer 500 may also be associated with the image file (e.g., as meta data), and downloaded to a computing device for use with photo-editing or other graphics software for editing the image (e.g., based on image layers).

It is noted that the exemplary embodiments discussed above are provided for purposes of illustration. Still other embodiments are also contemplated.

Exemplary Operations

Figure 6:
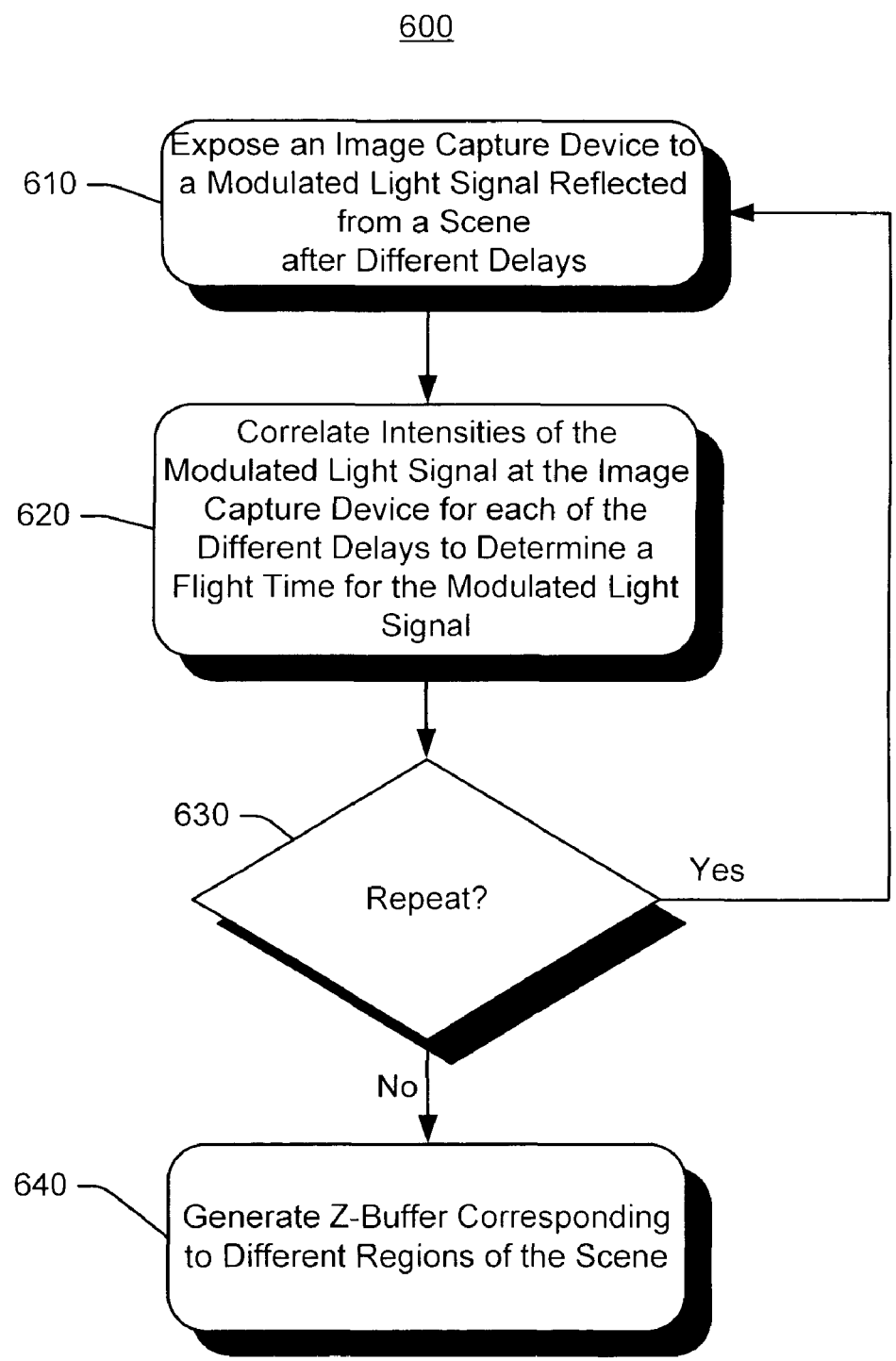
FIG. 6 is a flowchart illustrating exemplary operations which may be implemented for generating Z-buffers for an image capture device of a camera.

FIG. 6 is a flowchart illustrating exemplary operations to implement Z-buffer generation for an image capture device of a camera. Operations 600 may be embodied as logic instructions on one or more computer-readable medium in the camera. When executed on a processor at the camera, the logic instructions implement the described operations. In an exemplary embodiment, the components and connections depicted in the figures may be used to generate Z-buffers for an image capture device of a camera.

In operation 610, an image capture device having a plurality of pixels may be exposed to a modulated light signal reflected from different regions of a scene adjacent a camera after different delays. For example, the image capture device may be exposed to the modulated light signal through a shutter (e.g., the variable transmittance shutter 155 shown in FIG. 1). In operations 620, the intensity of the modulated light signal received by the image capture device may be analyzed for each the different delays to determine a flight time of the modulated light signal.

In operation 630, a decision is made whether to repeat the operations. For example, operations 610-620 may be repeated until a best fit correlation between the reflected light signal and the delayed copy is determined. In operation 640 the distance information may be stored for each pixel or group of pixels in a Z-buffer at the camera.

It is noted that the operations described above may be executed at any time during operation of the camera to generate a Z-buffer. For example, operations for distance measurements may be implemented prior to image capture and used, e.g., for focusing the camera on a scene, exposure compensation, etc. Or for example, distance measurements may be implemented following image capture to reduce delay before the camera is able to capture the image. In still another embodiment, operations for distance measurements may occur simultaneously with operations for image capture.

The operations shown and described herein are provided to illustrate exemplary embodiments of Z-buffer generation for an image capture device of a camera. It is noted that the operations are not limited to the ordering shown. For example, the Z-buffer may be generated (operation 640) before a decision is made to repeat operations (operation 630). Other operations (not shown) may also be executed to enable Z-buffer generation using an image capture device of a camera. For example, operations may be implemented to reduce the effects of noise. Or for example, operations may be implemented to enhance distance determinations made in low-light conditions. Still other operations (not shown) may be executed to use distance information stored in the Z-buffer. For example, the distance information may be associated with a file for editing an image captured by the camera at the camera or on a computing device (e.g., using image editing software).

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A system for generating Z-buffers in a camera, comprising:
   an image capture device having a plurality of pixels;
   a variable transmittance shutter configured to expose the plurality of pixels on the image capture device to a modulated light signal reflected from different regions of a scene adjacent the camera during different delay cycles; and
   a processor operatively associated with the image capture device, the processor generating a Z-buffer for the plurality of pixels based on the modulated light signal reflected from the different regions of the scene during the different delay cycles.

2. The system of claim 1 further comprising computer-readable memory operatively associated with the processor, the computer-readable memory including the Z-buffer for storing distance information at the camera.

3. The system of claim 1 wherein the variable transmittance shutter is configured to pass variable amounts of light based on a delayed version of the modulated light signal.

4. The system of claim 1 further comprising a programmable delay line, the programmable delay line activating the variable transmittance shutter after various delays.

5. The system of claim 1 further comprising a programmable delay line, the programmable delay line changing delays based on estimated flight times.

6. The system of claim 5 wherein the processor compares brightness values of the modulated light signals after the different delays to determine distance information for the Z-buffer.

7. The system of claim 6 wherein comparison at the processor is based on an autocorrelation function for pseudo-noise modulation.

8. The system of claim 1 further comprising:
   a light controller generating the modulated light signal at the camera; and
   a light source emitting the modulated light signal generated by the light controller.

9. The system of claim 1 wherein the Z-buffer includes distance information in non-linear format for the plurality of pixels.

10. The system of claim 1 wherein the processor reduces noise effects by modifying distance information in the Z-buffer based on other distance information in the Z-buffer.

11. A method comprising:
    exposing a plurality of pixels on an image capture device to a modulated light signal reflected from different regions of a scene adjacent a camera after different delays;
    correlating intensity of the modulated light signal received by the image capture device for each the different delays to determine a flight time of the modulated light signal; and
    generating a Z-buffer corresponding to the different regions of the scene based on the correlation.

12. The method of claim 11 wherein exposing a plurality of pixels on the image capture device is with a variable transmittance shutter operated to transmit light based on the modulated light signal.

13. The method of claim 11 further comprising:
    generating the modulated light signal at the camera; and
    emitting the modulated light signal onto the different regions of the scene.

14. The method of claim 11 further comprising reducing noise effects for the modulated light signal at the image capture device.

15. The method of claim 11 further comprising determining distance information for the Z-buffer before image capture.

16. The method of claim 11 further comprising determining distance information for the Z-buffer after image capture.

17. The method of claim 11 storing distance information in the Z-buffer in non-linear format.

18. A system comprising:
    image capture means for detecting light at a camera after different delays;
    varying transmittance means at the camera for transmitting a modulated light signal reflected from different regions of a scene adjacent the image capture means; and
    means for generating a Z-buffer for the scene based at least in part on the modulated light signal transmitted onto the image capture means.

19. The system of claim 18 further comprising means for correlating intensity of the modulated light signal transmitted onto the image capture means for different delay cycles.

20. The system of claim 18 further comprising means for reducing noise effects on the modulated light signal reflected from the different regions of the scene.

* * * * *

UNITED STATES PATENT AND TRADEMARK OFFICE
CERTIFICATE OF CORRECTION

| | | |
|---|---|---|
| PATENT NO. | : 8,391,698 B2 | Page 1 of 1 |
| APPLICATION NO. | : 11/261276 | |
| DATED | : March 5, 2013 | |
| INVENTOR(S) | : Turley et al. | |

It is certified that error appears in the above-identified patent and that said Letters Patent is hereby corrected as shown below:

In the Claim

Column 8, line 20, in Claim 11, delete "each the" and insert -- each of the --, therefor.

Signed and Sealed this
Twenty-ninth Day of April, 2014

Michelle K. Lee
*Deputy Director of the United States Patent and Trademark Office*